Aug. 4, 1936.    G. O. WILMS    2,050,076
ELECTRICAL CONTROL EQUIPMENT
Filed Nov. 17, 1932    3 Sheets-Sheet 1

Inventor
Gustav O. Wilms
By Ira Milton Jones
Attorney

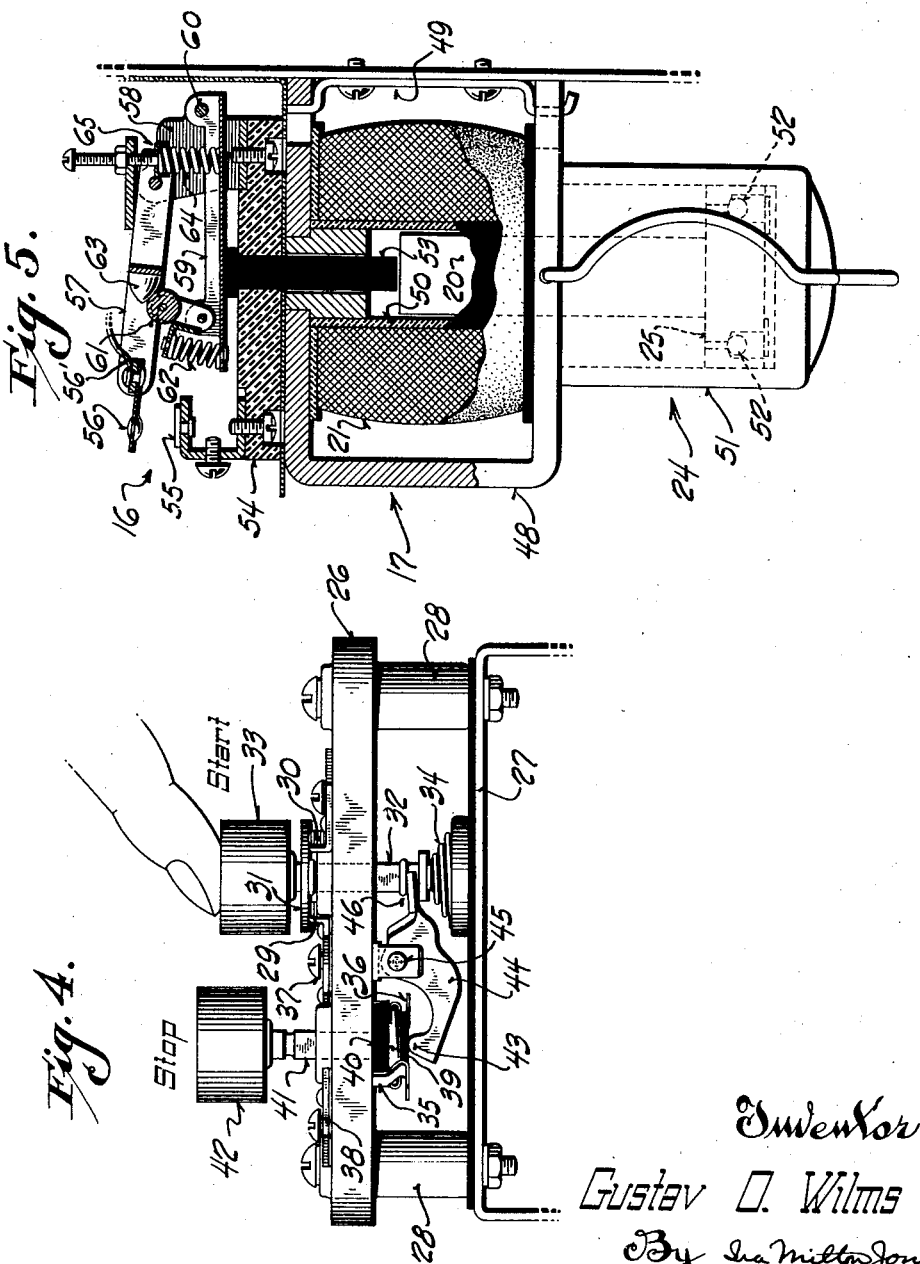

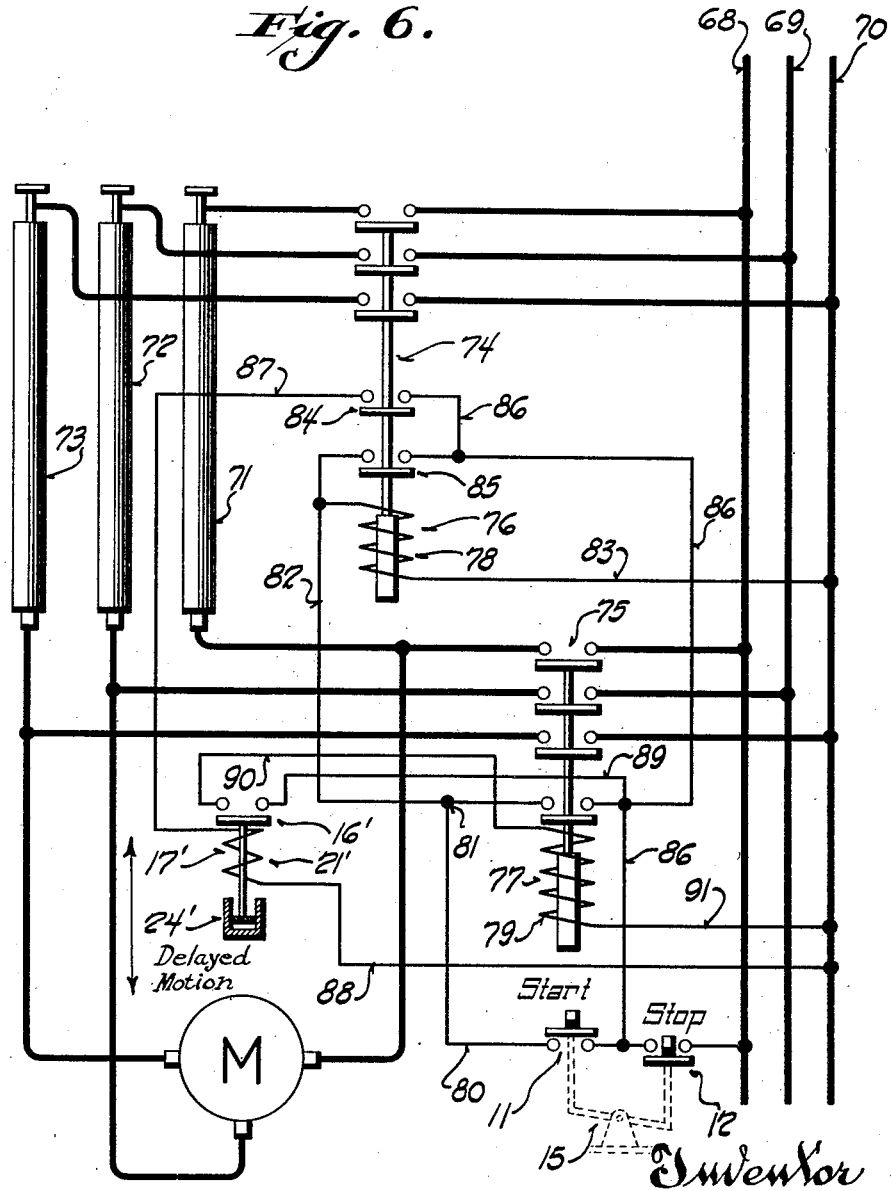

Patented Aug. 4, 1936

2,050,076

UNITED STATES PATENT OFFICE 2,050,076

ELECTRICAL CONTROL EQUIPMENT

Gustav O. Wilms, Milwaukee, Wis., assignor to Allen Bradley Company, Milwaukee, Wis., a corporation of Wisconsin Application November 17, 1932, Serial No. 643,034

11 Claims. (Cl. 175—294)

This invention relates to certain new and useful improvements in electrical control equipment and refers more particularly to means for providing automatic reestablishment of power circuit connections after a voltage dip or temporary under-voltage condition.

It is well known that electromagnetically held control equipment will drop out or open upon the occurrence of under-voltage conditions on the power supply line. As these under-voltage conditions are often but momentary, it is desirable to provide means for reestablishing the operative condition of the control equipment upon return of normal voltage conditions on the line. The provision of automatic means to accomplish this function is highly desirable in that manual operation of the "start" button at the control station is thereby obviated.

Heretofore, various devices and schemes have been employed to reconnect a load with the supply circuit upon reestablishment of normal voltage conditions, but in the majority of instances, past devices proposed for this purpose have depended for their operation upon a mechanical connection to the switch or other piece of control equipment with which the device was incorporated. Such mechanical connections have the disadvantage of entailing wearing surfaces and the necessity for close alignment and adjustment. Also, the addition of such devices to the control equipment itself adds to its overall dimensions and considerably increased the cost thereof.

In some instances, the delay mechanism was incorporated directly with the control station. Here the same objections existed, for the addition of such mechanism obviously required additional space and entailed a substantial increase in the size of the control station enclosure.

With the above and other objections to existing and past devices of this nature in mind, the present invention contemplates as one of its objects, the automatic connection of a load with its supply circuit upon the reestablishment of normal voltage conditions by means of a novel combination of elements electrically connected in contradistinction to the mechanical connections heretofore employed.

Where a time delay element is embodied to maintain the control circuit closed for a predetermined time, it is essential that means be provided to render this time delay element ineffective so as to insure immediate and maintained interruption of the control circuit upon actuation of the "stop" switch at the control station.

It is, therefore, another object of this invention to provide simple means for precluding reestablishment of the control circuit after actuation of the "stop" switch at the control station.

In this connection, it is a more specific object of this invention to provide means entirely independent of the time delay element for precluding the reestablishment of the control circuit after actuation of the stop switch at the control station.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 4 is a view similar to Fig. 2, illustrating the manner in which the two push button switches are closed;

Figure 5 is a side view with parts broken away and in section of the time delay relay and an associated switch structure employed in this invention; and—

Figure 6 is a diagrammatic illustration of an automatic motor starting control illustrating another application of this invention.

Figure 1:
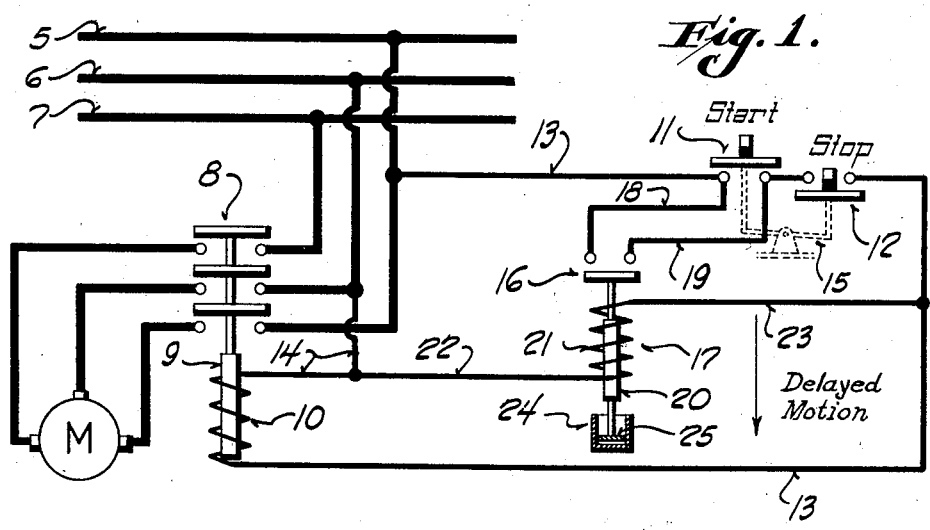
Figure 1 is a diagrammatic illustration of a motor control switch illustrating one application of this invention.

Referring now more particularly to the accompanying drawings in which like numerals indicate like parts throughout the several views, a simple embodiment of this invention is diagrammatically illustrated in Fig. 1. In this diagram, a motor "M" is adapted to be connected with power supply lines 5, 6 and 7 upon closing of an electromagnetically actuated switch 8. The switch 8 embodies the usual contactors which are actuated by the attraction of an armature 9 upon energization of a solenoid 10. The energization of the solenoid 10 is controlled from a remotely located control station embodying a "start" push button switch 11 and a "stop" push button switch 12.

The switches 11 and 12 are connected in series in a circuit consisting essentially of a conductor 13 leading from the power line 5 to one side of the solenoid 10, and a conductor 14 leading from the other side of the solenoid 10 to the power line 6. The switches 11 and 12 are both normally in their open positions and have a mechanical interlock diagrammatically illustrated in Fig. 1 as at 15, whereby the "stop" switch 12 is automatically closed by the closure of the "start" switch. The "stop" switch 12, however, is adapted to be held in its closed position independent of the "start" switch so that it remains closed after the "start" switch is permitted to open.

As the switches 11 and 12 are connected in series and close simultaneously, it is evident that upon actuation of the "start" switch, the solenoid 10 is energized to close its switch 8.

The circuit comprising the conductors 13 and 14 and including the "start" and "stop" switches, which may be referred to as the holding circuit deriving its energy from the main supply lines, is consequently subject to under-voltage conditions thereon so that when the voltage dips a predetermined degree, the solenoid 10 is deenergized to an extent where it permits its switch 8 to open. It may be reclosed by manually actuating the "start" switch, but to obviate this requirement, an auxiliary or maintaining switch 16, adapted to be closed by an electromagnet 17 is provided. The switch 16 is connected through conductors 18 and 19 in parallel with the "start" switch 11 so that when closed, the effect is the same as though the "start" switch were closed.

The electromagnet 17 for closing the switch 16 comprises an armature 20 and a solenoid 21, which when energized, attracts the armature and closes the switch 16. The solenoid 21 is connected in parallel with the solenoid 10 by conductors 22 and 23 so that it is energized simultaneously with the energization of the solenoid 10. Hence, closing of the "start" switch not only closes the main switch 8, but also closes the auxiliary maintaining switch 16.

Associated with the maintaining switch 16 is a time delay mechanism 24 to retard the opening of the switch 16. In the embodiment illustrated in Fig. 1, this time delay mechanism consists of a conventional dash pot having a piston 25 connected with the armature 20. The mechanism 24 is so adjusted that it maintains the switch 16 closed for a definite time interval after the occurrence of an under-voltage condition during which, both the solenoids 10 and 21 become deenergized.

As the maintaining switch 16 is in parallel with the "start" switch 11, it is evident that upon reestablishment of normal voltage conditions, the control circuit will again be active so that both the solenoids 10 and 21 will re reenergized. As a result, the closed position of the switch 8 is reestablished. No change takes place in the switch 16, however, for this unit has been held closed by the time delay mechanism.

Simple and effective means is thus provided for reconnecting the motor with its supply circuit upon reestablishment of normal voltage conditions.

To stop the motor, it is only necessary to actuate the "stop" switch 12 in the usual manner for as hereinbefore stated, this "stop" switch is normally open and is only releasably held in its closed position to which it has been moved, by actuation of the "start" switch. It is not necessary to hold the push button of the "stop" switch in until the time delay mechanism has functioned. A mere depression of the push button is sufficient.

*The push button control station*

Figure 2:
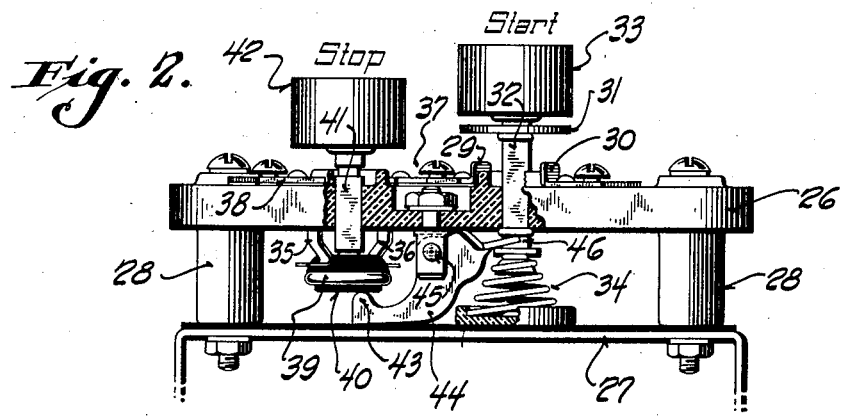
Figure 2 is a side elevation with parts broken away and in section of a push button control station constructed in accordance with this invention.
Figure 3:
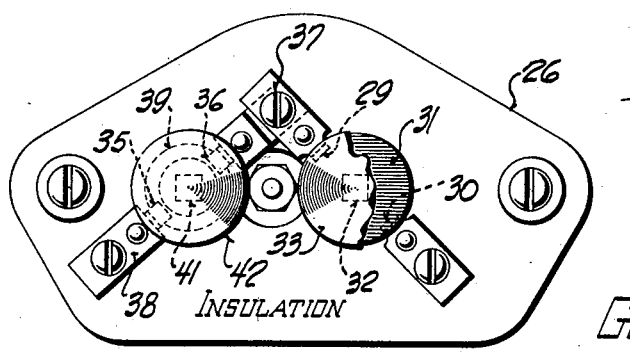
Figure 3 is a top plan view of the push button control station.

The specific construction of one embodiment of the push button control station is illustrated in detail in Figs. 2, 3 and 4. As here shown, the entire unit is mounted on a base 26 of insulating material spaced from a support 27 by posts 28. The upper face of the base 26 mounts two spaced contacts 29 and 30. These contacts are the fixed contacts of the "start" switch and are adapted to be bridged by a contactor 31 in the form of a metal disc mounted on a stem 32, which is slidable in an aperture in the base between the contacts 29 and 30.

The outer end of the stem 32 mounts a push button 33, and the inner end bears against an expansive spring 34 reacting against the support 27. The spring 34 thus biased the contactor 31 to its open position.

At a distance from the contacts 29 and 30, the base carries a second pair of contacts 35 and 36. These contacts, however, are disposed beneath the base, and are conveniently formed of strips of spring metal bent at right angles to have a vertical leg passing through openings in the base and a horizontal leg overlying the upper face of the base. The horizontal leg of the contact 36 is directly connected as at 37 with the contact 29, the connection 37 affording a common terminal for both of these contacts. The horizontal leg of the other contactor 35 is held down on the base by a terminal 38.

The lower end portions of the spring contacts 35 and 36 are directed inwardly toward each other to be electrically bridged by a contactor 39 in the form of a ring encircling a fiber button 40 carried by the lower end of a stem 41. The stem 41 is similar to the stem 32 and is slidably mounted in an aperture in the base and has a push button 42 at its upper end. When in its normal position, the contactor 39 is spaced from the contacts 25 and 36 where it is held by the resiliency of the contacts themselves by virtue of their engagement with the insulated button 40 as clearly shown in Fig. 2.

Further downward movement of the stem 41 and its associated elements including the contactor 39, is prevented by one end 43 of a lever 44, which provides the mechanical interlock 15 mentioned in the description of the diagram illustration shown in Fig. 1. This lever 44 is pivotally mounted as at 45 from a stud carried by the base and has its end opposite the end 43 engaged with the stem 32 as at 46. Consequently, depression of the "start" button 33 through the connection 46 rocks the lever 44 about its pivotal mounting and lifts the contactor 39 into a circuit making position shown in Fig. 4. In this position, the resiliency of the contacts 35 and 36 is again utilized to hold the "stop" switch in its closed position. It is evident that the "stop" switch will remain closed after the "start" switch is permitted to open. It is noted, however, that the mechanism is so constructed that simultaneous closing of both switches is assured, this being necessary to initiate the operative condition of the control circuit.

After the "start" switch has been actuated in the manner shown in Fig. 4, and pressure on its push button is released, the "stop" switch being held closed only by the resiliency of its contacts 35 and 36 is readily movable to open position by the usual and normal depression of its push button, and as it is not biased to closed position, but is held with the same degree of force in either open or closed position, it is evident that upon depression of its push button, it will remain open.

Timing relay and maintaining switch

A specific embodiment of the maintaining switch 16, its electromagnetic actuating means 17, and the time delay mechanism 24, is illustrated in Fig. 5. As shown, this structure embodies a magnetic frame 48 adapted to be clamped as at 49 to a supporting panel. Mounted in the frame is the solenoid 21. The solenoid has a tubular core 50 within which the armature 20 is slidably disposed, the armature extending downwardly beneath the frame and entering a dash pot 51 suspended from the frame. At the lower end of the armature is the piston 25 which has a snug sliding fit in the dash pot, and as is customary, is provided with ball check valves 52 to control the rate of movement of the piston in the dash pot.

The upper end of the armature 20 is arranged to abut an insulated push pin 53 mounted for vertical reciprocation and projecting upwardly through an insulated base 54 on which the switch 16 is mounted. The switch 16 embodies a fixed contact 55 and a movable contactor 56 electrically mounted on the outer free end of a pivoted mounted arm 57. A "pig tail" connection 56' leads from the contactor to a terminal (not shown) mounted on a suitable stationary part of the structure.

The arm 57 is pivoted on a support 58 secured to the base 54 opposite the contact 55, and is actuated to close or to open the switch with a snap action by means of a lever 59 pivoted from the support 58 as at 60. The lever 59 carries at its outer end a pivoted roller 61 yieldably projected toward the pivot 60 by a spring 62. The roller 61 engages a pointed nose 63 carried by the arm 57 so that as the lever 59 is raised and lowered, the roller 61 in passing over the point of the nose 63 will either close or open the switch with a snap.

A spring 64 bearing down on the lever 59 and receiving support from an adjustable stop 65 at all times urges the lever 59 downwardly into engagement with the upper end of the pin 53. Hence, upon energization of the solenoid 21 and upward movement of the armature, the lever 59 will be elevated to bring the contactor 56 into engagement with the contact 55.

It is desired to note at this time, that the upward movement of the armature is not cushioned by the dash pot. Only its downward movement permitted after deenergization of the solenoid is cushioned or retarded. Obviously, the switch will remain closed until the armature has moved downward sufficiently to permit the roller 61 to move beneath the point of the nose 63.

Motor starting control of Figure 6

The novel manner of reconnecting the motor with its supply line provided by this invention is not limited to the specific embodiment illustrated in Fig. 1, but is readily adaptable to many different types of control equipment and in Fig. 6, is illustrated its application to a motor starting circuit in which the starting of the motor involves the interposing of resistance to enable the motor to come to speed.

In this system, the motor "M" is connected with the power supply lines 68, 69 and 70, initially, through compressible resistors 71, 72 and 73 upon the closing of a starting switch indicated generally by the numeral 74, and then directly upon closing of a running switch 75.

The starting and running switches may be of any conventional construction embodying contactors operable to closed position upon energization of the electromagnets 76 and 77, respectively. The circuits completed by the closing of their contactors may be readily traced. The electromagnets 76 and 77 embody solenoids 78 and 79, respectively, and the energization thereof is controlled, respectively, by the "start" switch 11 of the control station which is identical to that shown in Fig. 1, and by a maintaining switch 16' similar to the switch 16.

As in the embodiment illustrated in Fig. 1, the maintaining switch 16' is closed by the energization of an electromagnet 17', but the closing as well as the opening thereof is retarded by a time delay element 24'. The "stop" switch 12 of the control station also has a mechanical interlock 15 with the "start" switch 11 so that the closing of the "start" switch simultaneously closes the "stop" switch. Hence, upon closing of the "start" switch 11, an energizing circuit for the solenoid 78 will be completed. This circuit may be traced from the main line 68 through a conductor 80 in which the "start" and "stop" switches are connected in series and which connects as at 81 with a conductor 82 leading to one side of the solenoid 78, the other side of the solenoid being connected through a conductor 83 with the supply line 70.

Upon energization of the solenoid 78, the starting switch 74 is closed to connect the motor with the supply lines through the resistors. With the closing of the switch 74, two auxiliary switches 84 and 85 are closed.

Closing of the switch 84 effects the energization of the solenoid 21' of the electromagnet 17' at the time delay device. The circuit for this solenoid beginning with the main line 68 continues through conductor 80, a conductor 86 connected thereto, the switch 84, a conductor 87 to one side of the solenoid 21', and a conductor 88 leading from the other side thereof to the main line 70.

Upon energization of the solenoid 21', the switch 16' tends to close, but does not do so until a definite time interval has elapsed as determined by the time delay mechanism 24'.

Upon closing of the switch 16' the circuit controlling the energization of the solenoid 79 of the running switch 75 is established. This circuit beginning with the main line 68 is traced through conductors 80, 86, a conductor 89 connected with the conductor 86, the switch 16', a conductor 90 to one side of the solenoid 79, and a conductor 91 leading from the other side thereof to the main line 70. The running switch 75 is thus closed to connect the motor directly with its supply lines.

All three solenoids 21', 78 and 79 remain energized as long as normal voltage conditions exist, but upon the occurrence of a voltage dip, all three are deenergized, the switches 74 and 75 dropping out immediately. The switch 16', however, because of the dual retarding action of the time delay mechanism 24' remains closed for a definite interval of time so that, if reestablishment of normal voltage conditions takes place during this time interval, the running switch 75 will be reclosed to reconnect the motor with its supply lines. The switch 74 will also be closed to maintain the solenoid 21' energized.

The circuit for the reclosing of the switch 75 is from the main line 69 through part of the conductor 80, the "stop" switch which is still in its closed position, the conductors 86 and 89, the switch 76', the conductor 90 to one side of the solenoid 79 through the solenoid, and out through the conductor 91 to the main line 70.

Immediately upon the closing of the switch 75, the circuit for the energization of the solenoid 78 is completed. This circuit is from the main line 68 through part of conductor 80 to an auxiliary switch 95 which is closed with the switch 75, through said switch 95 and conductor 82 to one side of the solenoid 78 and from the side thereof through conductor 83 to line 70. With the closing of the switch 76 as a result of the completion of the circuit just described, the switch 84 is closed to energize the solenoid 21. The circuit for this purpose begins with line 68 and continues through part of conductor 80, the closed stop switch 12, conductor 86, switch 84, and conductor 87 to one side of solenoid 21', and then out to line 70 through conductor 88.

From the foregoing description taken in connection with the accompanying drawings, it will be readily apparent to those skilled in the art, that this invention affords simple means for reestablishing power circuit connections after a voltage dip or temporary interruption of power, that it has a definite advantage in enabling ready adaptability to conventional control equipment without entailing expansive modification in design.

It is also apparent that, while a dash pot controlled time delay mechanism has been shown and described, many different timing mechanisms such as spring or weight controlled devices may be substituted for the structure shown without deviating from the spirit of the invention, which resides particularly in the combination of the elements as hereinafter more fully described by the appended claims.

What I claim as my invention is:

1. The combination with an electromagnetic switch for connecting an electrical translating device with a power supply line which is subject to voltage dips during which the electromagnetic switch opens, of means to automatically close the electromagnetic switch upon reestablishment of normal voltage comprising a circuit to energize the electromagnetic switch from the power supply line, a manually operable "start" switch biased to open position, means operable upon closing of the "start" switch to effect closure of said circuit, a maintaining switch to hold the circuit closed after the manually operable "start" switch opens, electromagnetic means energized from said power supply line as a result of closure of the manually operable "start" switch to close said maintaining switch and hold it closed as long as normal voltage conditions obtain on said line and its electromagnetic means is not positively disconnected from the line, time delay means to withhold opening of the maintaining switch for a definite time interval after deenergization of its operating electromagnetic means, a manually operable "stop" switch connected in said circuit and with the electromagnetic closing means of the maintaining switch for positively rendering the entire system inoperative, and means operable upon opening of the "stop" switch to hold the same against reclosing for a period of time longer than said definite time interval so as to prevent reclosing of the electromagnetic switch after opening of the "stop" switch.

2. Circuit controlling means comprising the combination of manually operable "start" and "stop" switches connected in series, the "start" switch being biased to open position, means for retaining the "stop" switch in either open or closed position, means to close said "stop" switch upon closing of the "start" switch whereby a circuit in which said "start" and "stop" switches are included is closed upon closing of the "start" switch, and an electromagnetically operable timing switch connected in parallel with the "start" switch to maintain said circuit closed after opening of the "start" switch for a predetermined time interval after deenergization of the electromagnetic means holding it closed.

3. In combination with control equipment having electromagnetic means to operate the same, a manually operable starting switch, a maintaining switch, electromagnetic means to close said maintaining switch, electric circuit connections affording the sole operative connection between the control equipment, the maintaining switch and the starting switch and connecting the electromagnetic operating means of the control equipment and the electromagnetic actuating means of the maintaining switch with the starting switch, and with a power supply line to simultaneously energize both electromagnetic means upon closing of the starting switch, said maintaining switch being in parallel with the starting switch to maintain the energizaton of both electromagnetc means after opening of the starting switch, time delay means to withhold opening of the maintaining switch for a predetermined time interval after deenergization of the electromagnetic means whereby upon reestablishment of normal voltage conditions on the power supply line after a temporary voltage dip reenergization of both electromagnetic means is automatically effected, and a stop switch manually operable to an automatically held open position included in said circuit connections to interrupt the same and to effect a continued deenergization of both electromagnetic means.

4. Circuit control means comprising the combination of a manually operable starting switch biased to open position, a manually operable stop switch holdable in either open or closed position, means interlocking said switches to close the stop switch upon closure of the starting switch, an electromagnetically operable maintaining switch, means to electrically connect said starting switch, the stop switch and the electrically operable maintaining switch so that the circuit to be controlled is closed upon closure of the starting switch and is held closed by the maintaining switch until deenergization of its electromagnetic operating means or opening of the stop switch, and time delay means to withhold opening of the maintaining switch for a definite time interval after deenergization of its electromagnetic operating means.

5. In combination with control equipment having electromagnetic means to operate the same, a control circuit to connect the electromagnetic means with a supply line to effect its energization, a manually operable starting switch operable to close said control circuit, a maintaining switch to maintain the control circuit closed after opening of the starting switch, a second electromagnetic means to close said maintaining switch, said second electromagnetic means being connected to said circuit to be energized simultaneously with the energization of the first named electromagnetic means, time delay means to hold said maintaining switch closed for a predetermined time interval after deenergization of its operating electromagnetic means whereby the control circuit is maintained closed for said predetermined time interval after the occurrence of a voltage dip on the line, and a manually operable stop switch in said circuit operable to an automatically held open position to maintain the circuit open.

6. The combination with a circuit controlling device comprising a manually operable "on" switch biased to the open position, in series circuit with a manually operable "off" switch operable to open position by its own actuator and operable to closed position by the "on" switch, an electroresponsive means including a switch adapted to shunt the "on" switch, an energizing circuit for the electroresponsive means adapted to be completed by closure of the "on" switch, energization of the electroresponsive means closing its switch so as to shunt the "on" switch and maintain the energizing circuit closed, and time delay means for delaying opening of said switch upon said electroresponsive means being deenergized.

7. The combination with an electromagnetic switch for connecting an electrical translating device with a power supply line which is subject to voltage dips during which the electromagnetic switch opens, of means to automatically close the electromagnetic switch and re-connect the translating device with the power line upon reestablishment of normal voltage thereon comprising, a push button control station including manually operable "start" and "stop" switches, a circuit connecting the control station with the electromagnetically operable switch whereby closing of the "start" switch closes said electromagnetic switch, a maintaining switch in parallel with the "start" switch, means to close said maintaining switch, said means being operative simultaneously with the closing of the electromagnetic switch, time delay means to withhold opening of said maintaining switch for a definite time interval whereby the reestablishment of normal voltage on said line within said time interval closes the electromagnetic switch to re-connect the translating device with said line, the "stop" switch being in series with the "start" and maintaining switches so that opening of the "stop" switch interrupts the holding circuit of the electromagnetic switch, and means to restrain the "stop" switch against reclosing after it has been opened.

8. The combination with an electromagnetic switch for connecting an electrical translating device with a power supply line which is subject to voltage dips during which the electromagnetic switch opens, of means to automatically close the electromagnetic switch and reconnect the translating device with the power line upon reestablishment of normal voltage thereon, comprising a push button control station including manually operable "start" and "stop" switches, a circuit connecting the control station with the electromagnetic switch with the "start" and "stop" switches connected in series and so that closing of the "start" switch effects closure of said electromagnetic switch and opening of the "stop" switch effects opening of the electromagnetic switch, a maintaining switch in parallel with the "start" switch, means for closing said maintaining switch simultaneously with the closing of the electromagnetic switch, time delay means to withhold opening of said maintaining switch for a definite time interval whereby the reestablishment of normal voltage on said line within said time interval closes the electromagnetic switch to reconnect the translating device with said line, and means operable upon opening of the "stop" switch to hold the same against reclosing for a period of time longer than said definite time interval so as to prevent reclosing of the electromagnetic switch after actuation of the "stop" switch to effect opening of the electromagnetic switch.

9. The combination with electromagnetic switch means for connecting an electrical translating device with a power supply line which is subject to voltage dips during which the electromagnetic switch means opens, of means to automatically close the electromagnetic switch means upon reestablishment of normal voltage within a predetermined time interval, comprising a "start" switch biased to open position, a "stop" switch connected in series with the "start" switch and adapted to be closed by closure of the "start" switch, circuit means to effect energization and closure of the electromagnetic switch means upon closure of the "start" switch, a maintaining switch adapted when closed to maintain said circuit means operable to effect energization and closure of the electromagnetic switch means independently of the "start" switch, electroresponsive means energized from the power supply line for closing the maintaining switch and maintaining it closed until the occurrence of a voltage dip of sufficient proportions or the opening of the "stop" switch, time delay means to withhold opening of the maintaining switch for a definite time interval so that upon reestablishment of normal voltage on the power supply line within said time interval the electromagnetic switch means will be reenergized and closed to reconnect the translating device with the line, and means operable upon opening of the "stop" switch to hold the same against reclosing for a period of time longer than said definite time interval so as to prevent reclosing of the electromagnetic switch after actuation of the "stop" switch to effect opening of the electromagnetic switch.

10. A control circuit for an electrically operable device comprising a manually operable "start" switch biased to open position, a "stop" switch operable to a maintained open position by manual means and to a maintained closed position by closure of the "start" switch, said switches being connected in series in said control circuit, and a timing switch electrically energized and operable to bridge the "start" switch upon closure of the control circuit and adapted to delay opening of the control circuit a time interval after being deenergized.

11. In combination with electromagnetic starting and running switches for connecting an electrical translating device with a power supply line which is subject to low voltage dips, a "start" switch, biased to open position, a "stop" switch in series with the "start" switch and adapted to be closed by closure of the "start" switch, means for closing the "stop" switch upon closure of the "start" switch, a timing switch adapted upon closure to close the running switch and to maintain the same closed, electromagnetic means energized from the supply line upon closure of the starting switch to close the timing switch and hold it closed until a voltage dip on the line or opening of the "stop" switch, and time delay means for retarding closure of the timing switch to space the closure of the running switch a definite time interval after closure of the starting switch and to withhold opening of the timing switch so as to maintain the running switch closed for a predetermined time interval after deenergization of its closing means.

GUSTAV O. WILMS.